United States Patent [19]
Petree

[11] 3,832,767
[45] Sept. 3, 1974

[54] METHOD OF STRIPPING INSULATION

[75] Inventor: Edwyn H. Petree, Burlington, N.C.

[73] Assignee: Western Electric Company, Incorporated, New York, N.Y.

[22] Filed: Mar. 27, 1973

[21] Appl. No.: 345,382

[52] U.S. Cl.................. 29/427, 29/203 R, 81/9.51, 83/24
[51] Int. Cl............................................. B23p 19/02
[58] Field of Search.................. 29/427, 203 R, 628; 81/9.51, 9.5 R, 9.5 A; 83/24

[56] References Cited
UNITED STATES PATENTS

| | | | |
|---|---|---|---|
| 1,709,942 | 4/1929 | Leguillon | 82/24 |
| 2,568,466 | 9/1951 | Scott | 81/9.51 |
| 2,951,403 | 9/1960 | Bunch et al. | 81/9.51 |
| 3,171,306 | 3/1965 | Mirsch | 81/9.51 |
| 3,267,774 | 8/1966 | Bilco et al. | 81/9.51 |
| 3,621,560 | 11/1971 | LeBright | 29/427 |
| 3,768,143 | 10/1973 | Holmes | 29/427 |

Primary Examiner—Charles W. Lanham
Assistant Examiner—James R. Duzan
Attorney, Agent, or Firm—W. L. Williamson

[57] ABSTRACT

A length of severed insulation is stripped from a conductor by applying pressurized fluid between the conductor and the insulation to generate a fluid bearing therebetween and by then moving the insulation from the conductor along the fluid bearing. The insulation may be severed by (1) cutting partially through the insulation and applying pressurized fluid between the conductor and the insulation to expand and rupture the insulation at the cut; by (2) using the pressurized fluid to expand the insulation against a cutting blade; or by (3) using a precision cutting technique without the application of pressurized fluid.

10 Claims, 5 Drawing Figures

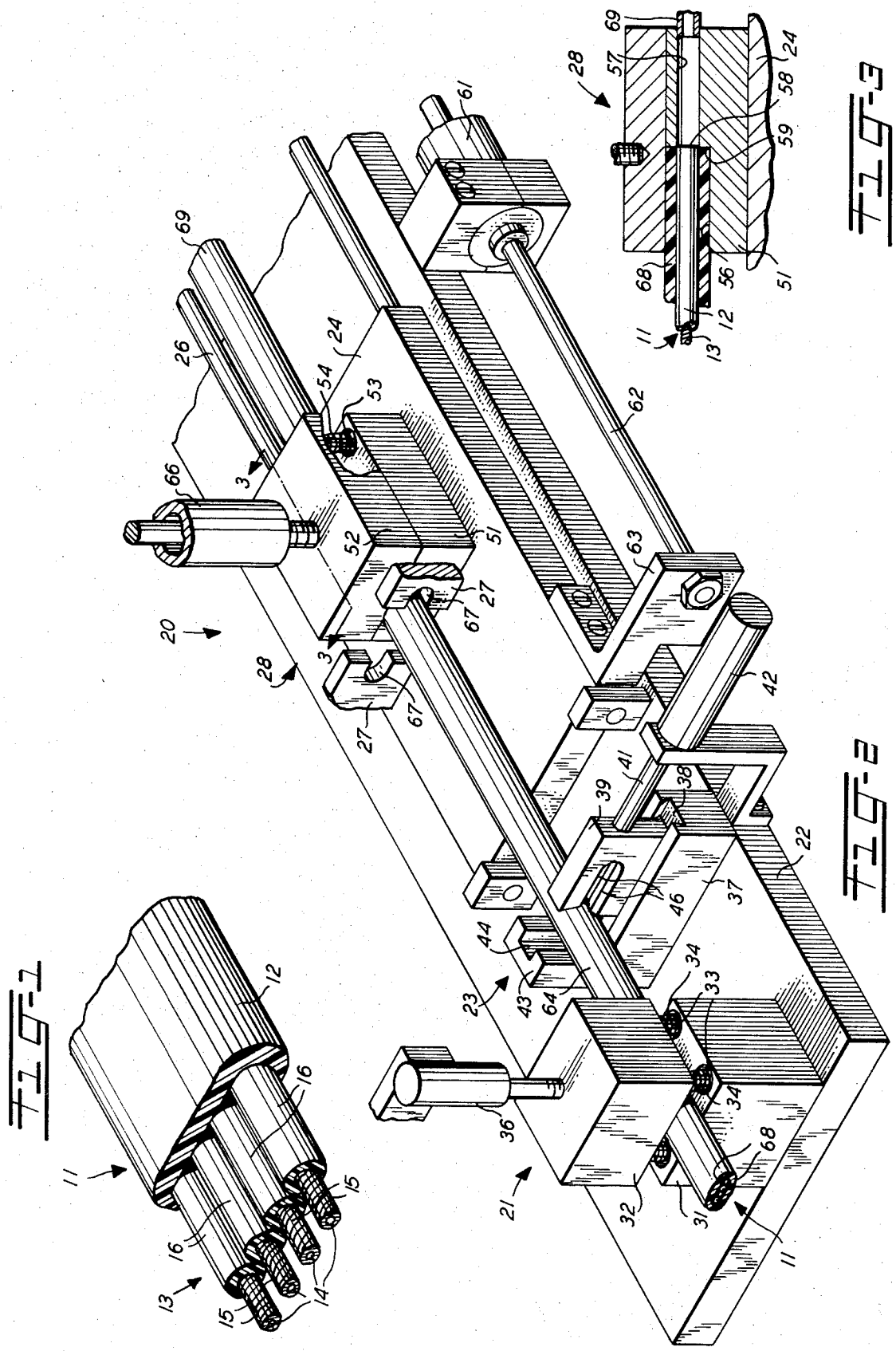

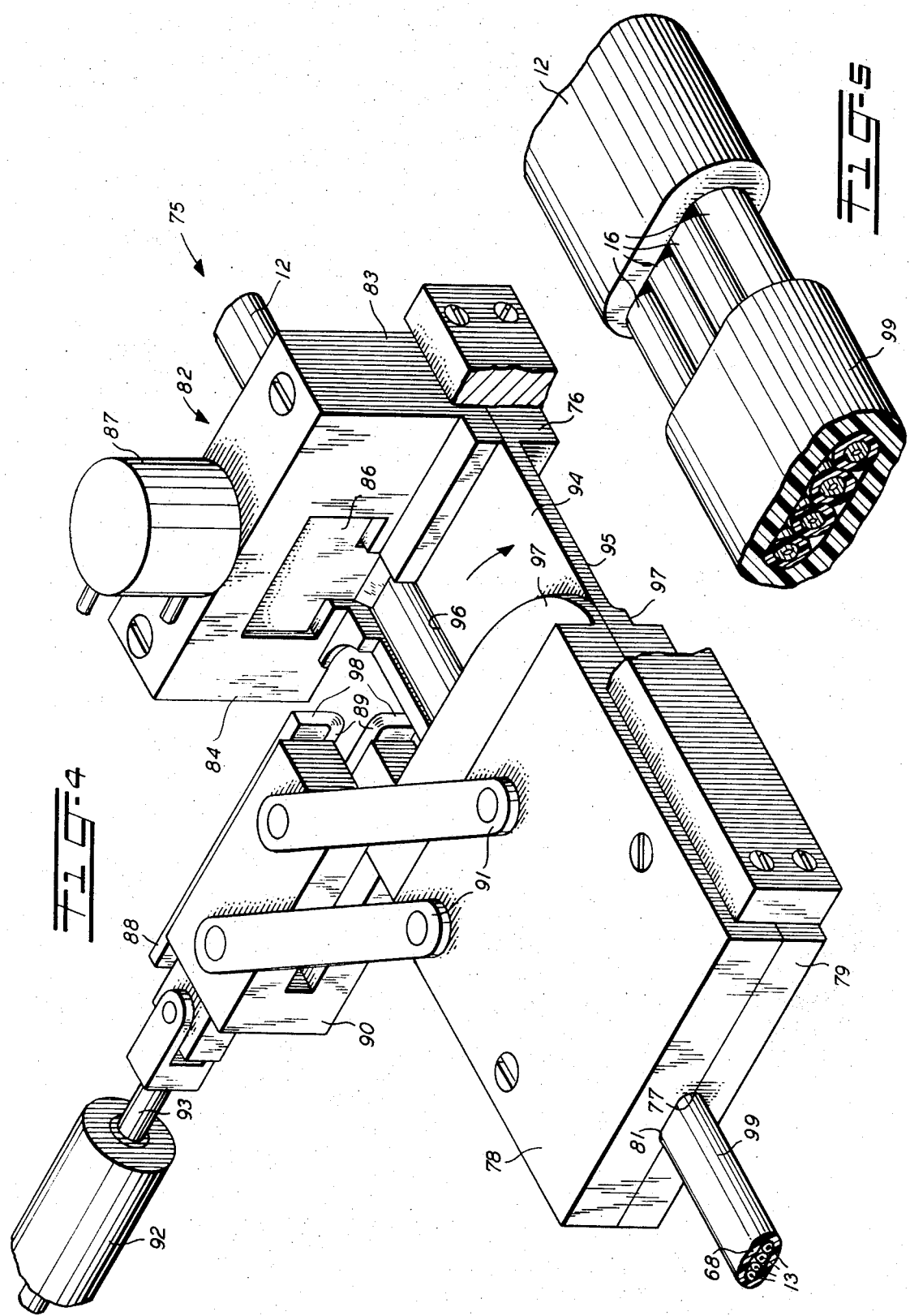

METHOD OF STRIPPING INSULATION

BACKGROUND OF THE INVENTION

1. Field of the Invention

This invention relates to methods of stripping insulation and, more particularly, to methods of stripping a predetermined length of insulation from a conductor using pressurized fluid.

2. Discussion of the Technical Problem

It is well known to strip insulation from an insulated conductor by cutting the insulation a desired distance from one end of the conductor and then pulling the insulation from the conductor. For example, a pair of opposed knife blades may be used to cut the insulation on opposite sides thereof and then to bear against the cut edge of the insulation to pull the insulation from the conductor.

Unfortunately, the conductor is susceptible to nicking or scratching during the cutting and stripping of the insulation. The conductor is particularly susceptible to damage during the stripping of relatively thin insulation. Also, if the conductor is fragile, the force required to pull the insulation therefrom may cause the conductor to break. Finally, if the insulation comprises a jacket over several conductors (which may have individual insulative coverings), the force required to strip the jacket may result in a very difficult stripping operation and an increased probability of damage to the conductors.

It is also well known to strip a jacket from insulated conductors by first slitting the jacket lengthwise and then peeling the jacket from the conductors. However, it is frequently difficult to slit the jacket without damaging the conductors. In addition, the combined slitting and peeling operation is not well suited to automated stripping devices.

SUMMARY OF THE INVENTION

The invention contemplates a method of stripping a severed length of insulation from a conductor, including the steps of injecting pressurized fluid between the conductor and the insulation to generate a fluid bearing therebetween and removing the insulation from the conductor along the fluid bearing. The invention also includes severing the insulation by the alternate steps of (1) cutting partially through the insulation and injecting pressurized fluid between the conductor and the insulation to rupture the insulation along the cut; (2) using the pressurized fluid to expand the insulation against a cutting blade; or (3) using a precision cutting technique without the initial application of pressurized fluid.

BRIEF DESCRIPTION OF THE DRAWINGS

FIG. 1 is an isometric view of a cut away section of a conductor cord having an insulative jacket that may be severed and stripped according to the method of the invention.

FIG. 2 is an isometric view, partially cut away, of a wire stripper device suitable for practicing the method of the invention on the conductor cord shown in FIG. 1.

FIG. 3 is a sectional view, taken along the lines 3—3 in FIG. 2, of a nozzle assembly employed in the wire stripper device.

FIG. 4 is an isometric view of a cutting device suitable for the practicing an alternate method of severing the insulative jacket on a conductor cord similar to that shown in FIG. 1.

FIG. 5 is an isometric view of a section of conductor cord having the jacket thereof severed by the cutting device shown in FIG. 4.

DETAILED DESCRIPTION

Shown in FIG. 1 is a conductor cord 11 having an insulative jacket 12 (comprised typically of polyvinylchloride) that may be severed and stripped according to the method of the present invention. The jacket 12 encases a plurality of insulated conductors 13—13, for example, ribbon conductors 15—15 that are wrapped about nylon threads 14—14 and have insulative coverings 16—16. However, the invention is equally applicable to cords having insulated conductors wherein the conductor is a single strand conductor (not shown).

Referring now to FIG. 2, there is shown a wire stripper 20 that is suitable for severing and stripping a predetermined length of jacket 12 from the insulated conductors 13—13.

The wire stripper 20 includes a cord clamping device 21 that is mounted at one end of a frame 22 and a cutter assembly 23 that is mounted on the frame adjacent the clamping device for cutting the jacket 12 of the cord 11. A platform 24 is slidably mounted on frame rails 26—26 for reciprocal movement relative to the cutter assembly 23. The platform 24 mounts a pair of clamping members 27—27 that are used in cooperation with the cord clamping device 21 to securely position the cord 11 during a jacket severing operation and are then used to strip the jacket 12 from the insulated conductors 13—13. The platform 24 also mounts a nozzle assembly 28 on the side of the clamping members 27—27 opposite the cutter assembly 23 for applying pressurized fluid between the insulated conductors 13—13 and the jacket 12 to facilitate the severing and stripping operation.

The cord clamping device 21 includes a lower block 31 mounted to the frame 22 and an upper block 32 that is slidably mounted on guide pins 33—33 extending upwardly from the lower block. The upper block 32 is normally biased away from the lower block 31 by springs 34—34. The cord 11 may be clamped between the lower and upper blocks 31 and 32 by inserting the cord therebetween and then displacing the upper block toward the lower block using an air cylinder 36.

The cutter assembly 23 includes a guide member 37 that is mounted to the frame 22 and has a bevel-sided groove 38 formed therein for receiving a bifurcated cutting blade 39. A piston rod 41 of air cylinder 42 is connected to the cutting blade 39 for reciprocating the blade transversely to the length of the cord 11 and across the upper and lower sides of the jacket 12. The guide member 37 has an upwardly extending arm 43 that prevents lateral movement of the cord 11 as the blade 39 moves across the jacket 12. A groove 44 is formed in the arm 43 for receiving a leading edge of the blade 39 so that blade cutting surfaces 46—46 may move across the entire width of the jacket 12.

The nozzle assembly 28 includes a lower plate 51 that is mounted to the platform 24 and an upper plate 52 that is slidably mounted on guide pins 53—53 extending upwardly from the lower plate. The upper plate 52 is normally biased away from the lower plate 51 by springs 54—54 (only one guide pin and one spring are shown).

Referring now to FIG. 3, a groove 56 having the same cross-sectional size and shape as the cord 11 is formed in the lower plate 51 of the nozzle assembly 28 for receiving the cord. The groove 56 is coincident with a fluid passageway 57 that has the same cross-sectional size and shape as the inside of the jacket 12. When the cord 11 is inserted into the nozzle assembly 28, a leading end 58 of the cord is positioned by a shoulder 59 formed between the groove 56 and the fluid passageway 57. The fluid passageway 57 may then be used to inject a pressurized fluid between the insulated conductors 13—13 and the jacket 12 via the leading end 58 of the cord 11 during the severing and stripping of the jacket.

Referring again to FIG. 2, the length of jacket 12 that is to be stripped from the cord 11 is determined by the mounting position of the cutter assembly 23 relative to a fully advanced position (to the left in FIG. 2) of the reciprocable platform 24. Reciprocation of the platform 24 may be effected by a frame-mounted air cylinder 61 having a piston rod 62 extending therefrom that is connected to a bracket 63 mounted on the platform. Prior to positioning a cord 11 in the wire stripper 20, the air cylinder 61 is actuated to fully advance the piston rod 62 and position the platform 24 relative to the cutter assembly 23. The mounting position of the cutter assembly 23 will have been chosen such that positioning the platform 24 establishes a distance between the shoulder 59 (FIG. 3) in the nozzle assembly 28 and the cutter blade 39 that is equal to the length of jacket 12 desired to be cut from the cord 11. Thus, when the cord 11 is positioned in the wire stripper 20, the leading end 58 abuts the shoulder 59 and is thereby positioned the desired distance from the cutting blade 39.

To position the cord 11 in the wire stripper 20, the cord is passed between the normally open blocks 31 and 32 of the clamping assembly 23 and inserted between the normally open plates 51 and 52 of the nozzle assembly 28 so that the leading end 58 of the cord abuts the shoulder 59 (FIG. 3) formed in the lower plate 51. Also, a trailing section 64 of the cord 11 is positioned against the arm 43 of the guide member 37.

The air cylinder 36 is now actuated to lower the upper block 32 of the clamping assembly 21 toward the lower block 31 to securely grip the positioned trailing section 64 of the cord 11 therebetween. At the same time, an air cylinder 66 is actuated to move the upper plate 52 of the nozzle assembly 28 downwardly and against the lower plate 51 to enclose the groove 56 (FIG. 3).

The cord 11 must be securely positioned relative to the nozzle assembly 28 to prevent ejection of the cord therefrom upon the application of pressurized fluid. However, the groove 56 (FIG. 3) is formed to the same size and shape as the cord 11 to prevent the cord from being firmly engaged upon the lowering of the upper plate 52, since such engagement might pinch off the passage of fluid between the insulated conductors 13—13 and the jacket 12. Instead, the cord 11 is securely positioned, and without pinching off the passage of fluid, by the clamping members 27—27.

The clamping members 27—27 have semicircular slots 67—67 formed therein for engaging the cord 11. When the clamping members 27—27 are in a position of abutment with one another, the slots 67—67 form a circle having a diameter that is less than the cord width and greater than the cord height. (That is, the combined radii of the slots 67—67 are less than the width of the cord 11 and the diameter of each slot is greater than the height or vertical thickness of the cord.) For the particular cord 11 of width 0.200 inches and height 0.100 inches, a typical slot radius/diameter would be 0.0625 inches/0.1250 inches.

Because the width of the cord 11 is greater then the combined radii of the slots 67—67, when the cutting members 27—27 are moved toward one another (by any suitable reciprocating means, not shown), the cord is firmly gripped at its sides and is compressed across its width. Also, because the diameter of each slot 67 is greater than the height of the cord 11, there is sufficient space between the jacket 12 and the slots 67—67 for the middle sections of upper and lower jacket walls 68—68 (see also FIG. 3) to deform upwardly and downwardly, respectively, upon compression of the cord. As a result of this deformation, gaps are created between the conductors 13—13 and the jacket 12. Pressurized fluid may thus be passed between the conductors 13—13 and the jacket 12 to permit severing and stripping of the jacket according to the method of the invention.

One embodiment of the method of the invention includes the steps of (1) cutting the jacket partially through the thickness thereof, (2) injecting pressurized fluid between the conductors and the jacket to expand the jacket and sever the jacket along the cut and (3) stripping the severed jacket from the conductors along a fluid bearing generated by the pressurized fluid.

Referring to FIG. 2, the step of partially cutting through the thickness of the jacket, i.e., nicking the jacket, is initiated by actuating the air cylinder 42 to advance the cutting blade 39 (from a normal position spaced to the right of the cord 11, as viewed in FIG. 2) transversely across the jacket until the leading end of the blade is received by the groove 44. There is sufficient space between the cutting surfaces 46—46 of the blade 39 to ensure that the advancing blade cuts the jacket 12 substantially through the upper and lower walls 68—68 thereof, yet does not cut completely through the walls and consequently cannot damage the conductors 13—13. For example, for the cord height of 0.100 inches and a jacket wall thickness of approximately 0.045 inches, the cutting surfaces 46—46 are spaced apart about 0.020 inches. The cutting surfaces 46—46 then cut each of the upper and lower jacket walls 68—68 to a depth of about 0.040 inches, leaving an uncut thickness in each wall of about 0.005 inches.

After the cutting blade 39 has been advanced into the groove 44 in the guide member arm 43 to cut across the entire width of the jacket walls 68—68, the wire stripper 20 is readied for the step of severing the cut jacket 12 by actuating the air cylinder 42 to withdraw the cutting blade from the jacket 12. The step of severing the jacket 12 is then initiated by applying fluid, such as air, from a pressure source (not shown) through a tube 69 that connects to the fluid passageway 57 (FIG. 3) of the nozzle assembly 28.

Referring now to FIG. 3, the fluid passageway 57 is concentric with the groove 56 and, as previously mentioned, has the same cross-sectional size and shape as the inner surface of the jacket 12. Consequently, as the pressurized air enters the fluid passageway 57, the air is directed (to the left in FIGS. 2 and 3) against the leading end 58 of the cord 11 and into the area defined by the inner surface of the jacket 12.

Referring again to FIG. 2, the pressurized air then flows through the gaps produced between the jacket 12 and the insulated conductors 13—13 by the clamping members 27—27 and through the cord 11 to the cord clamping device 21. There, continued leftward flow is terminated by the closed blocks 31 and 32 of the cord clamping device 21. Consequently, continued application of air to the leading end 58 (FIG. 3) of the cord 11 expands the jacket 12 until the jacket ruptures along the cut portions of the walls 68—68. As will be appreciated, severing the jacket 12 by expansion precludes the possibility of mechanical cutting means contacting the conductors. As a result, the possibility of damaging the insulated conductors 13—13 is eliminated.

By applying air of sufficiently high pressure to the leading end 58 (FIG. 3) of cord 11, the jacket 12 may be expanded with enough force to rupture the small uncut sections at the right and left sides of the jacket as well as to rupture the walls 68—68. That is, the jacket 12 may be severed about its entire circumference. If the side portions of the jacket 12 are not ruptured by the expansion of the jacket, they are readily separated during the subsequent step of stripping the jacket from the insulated conductors 13—13.

Referring further to FIG. 2, the step of stripping the severed jacket 12 from the insulated conductors 13—13 is accomplished while pressurized air is continuously applied to the leading end 58 (FIG. 3) of the cord 11. The air now flows from the leading end 58 of the cord 11 to, and escapes the cord at, the severed portion thereof, thereby generating a fluid bearing or cushion between the jacket 12 and the insulated conductors 13—13.

The platform air cylinder 61 is now actuated to withdraw the piston rod 62, the platform 24 and the closed clamping members 27—27 from the cutter assembly 23. As they are withdrawn, the closed clamping members 27—27 pull the severed end section of the jacket 12 over the fluid bearing. The fluid bearing substantially reduces the friction between the jacket 12 and the insulated conductors 13—13, thereby substantially reducing the force required to pull the severed end section of the jacket 12 along the insulated conductors 13—13. Consequently, the withdrawing clamping members 27—27 strip the severed end section from the insulated conductors 13—13 without damaging the insulated conductors, leaving a predetermined end length of unjacketed conductors.

Subsequent to the stripping step, the clamping members 27—27 are opened, that is, retracted from the stripped end section of the jacket 12 to release and permit the removal of the end section. The air cylinders 36 and 66 are then actuated to move the upper block 32 of the cord clamping assembly 21 and the upper plate 52 of the nozzle assembly 28 upwardly so that the cord 11 may be removed from the wire stripper 20. The air cylinder 61 is then actuated to advance the platform 24, the clamping members 27—27 and the nozzle assembly 28 into position to load another cord 11 for a severing and stripping operation.

An alternate method of severing and stripping the jacket 12 from the insulated conductors 13—13 comprises the steps of (1) injecting pressurized fluid between the insulated conductors and the jacket to expand the jacket against the cutting blade and thereby sever the jacket and (2) stripping the severed jacket from the conductors along a fluid bearing generated by the pressurized fluid.

Referring to FIG. 2, pursuant to this alternate method, the jacket 12 is cut during, and not prior to, its expansion. Accordingly, the knife-edged cutting surfaces 46—46 of the blade 39 are formed with a sufficient spacing therebetween so they can be positioned about the cord 11 prior to the expansion of the jacket 12. For example, for the cord 11 height of about 0.100 inches, the cutting blades 46—46 may be spaced approximately 0.120 inches.

Preparatory to a severing and stripping operation, the cord 11 is positioned within the wire stripper 20 and air cylinder 36 and reciprocating means (not shown) are actuated to move the cord clamping device 21 and the clamping members 27—27, respectively, into gripping engagement with the cord. Also, the air cylinder 66 is actuated to close the nozzle assembly 28 about the cord 11. Finally, the air cylinder 42 is actuated to advance the bifurcated blade 39 across the cord 11 so the cutting surfaces 46—46 are positioned above and below the jacket walls 68—68.

The step of expanding and severing the jacket 12 is initiated by injecting pressurized fluid such as air into the cord 11 at the leading end 58 (FIG. 3). As explained previously, the closed cord clamping device 21 stops the flow of air through the cord 11 (the flow is to the left as viewed in FIG. 2) and, upon continued application of air, the jacket expands. As a result, the jacket walls 68—68 are forced against the cutting blades 46—46 and are thereby severed. Approximately 100 p.s.i. is sufficient pressure to expand and sever the polyvinylchloride jacket 12 having height, width and thickness of about 0.100, 0.200 and 0.045 inches, respectively. However, other pressures should work equally well. Also, it is obvious that insulative coverings comprised of other materials and having different dimensions may be severed according to this method by appropriate adjustment of the spacing between the blade cutting surfaces 46—46 and of the pressure of the injected fluid.

Referring generally to FIG. 1, in certain instances an insulative covering such as the jacket 12 may be formed from a relatively inflexible material that is expanded sufficiently by the injection of pressurized fluid to create an effective fluid bearing for stripping the jacket, but is not sufficiently flexible to permit severing the jacket by expansion.

When such a relatively inflexible material is used in the jacket 12, it is desirable to sever the jacket before the application of pressurized fluid thereto.

Shown in FIG. 4 is a cutting device 75 that is suitable for precisely severing the jacket 12, and without damaging the insulated conductors 13—13, prior to the use of the wire stripper 20 (FIG. 2) to strip the jacket from the conductors. The method of severing and stripping the jacket 12 then comprises the steps of (1) cutting the jacket partially through the thickness thereof, (2) displacing the jacket along the insulated conductors to separate the jacket at the cut and (3) stripping the jacket from the insulated conductors along a fluid bearing generated by injecting a pressurized fluid between the conductors and the jacket.

The cutting device 75 includes a base 76 that has a longitudinal groove 77 formed therein for receiving the cord 11. A cover 78 mounted to a first end 79 of the base 76 has a groove 81 formed therein that is coincident with the groove 77 for slidably aligning the cord 11. A clamping device 82 is mounted to a second end 83 of the base 76 for clamping the cord 11 within the groove 77.

The clamping device 82 comprises a housing 84 that slidably supports a clamp 86 for reciprocal movement transverse to the longitudinal groove 77. The clamp 86 is reciprocated by any suitable means such as an air cylinder 87 for clamping the cord 11 within the longitudinal groove 77.

The cutting device 75 also includes a bifurcated blade 88 that has knife-edged upper and lower cutting surfaces 89—89. The blade 88 is mounted to a bifurcated support block 90 that is mounted on links 91—91 for reciprocal movement transverse to the length of the cord 11. Typically, reciprocation of the support block 90 and the blade 88 is effected by an air cylinder 92 having a piston rod 93 that is pivotally connected to the support block.

upon actuation of the air cylinder 92 to advance the blade 88 from the position shown in FIG. 4 toward the cord 11, the upper cylinder surface 89 moves along a first transverse groove 94 formed (between the base cover 78 and the housing 84) across the upper surface of the base 76, while the lower cutting surface 89 moves along a second transverse groove 95 formed across the bottom of the base. The portion of the longitudinal groove 77 that crosses the second transverse groove 95 forms a slot 96 through the base 76. The jacket walls 68—68 protrude above and below the slot 96 and are cut by the cutting surfaces 89—89 of the advancing blade 88.

The cutting surfaces 89—89 are spaced such that they cut substantially through the jacket walls 68—68 to permit easy separation of the jacket along the cuts. As described previously for the blade 39 (FIG. 2), for the jacket 12 having a height of about 0.100 inches and a wall thickness of about 0.045 inches, the cutting surfaces 89—89 are spaced about 0.020 inches. The cutting surfaces 89—89 thus cut the jacket walls 68—68 to a depth of about 0.040 inches, leaving about 0.005 inches of the thickness of the walls uncut. In addition, the support block 90 and the blade 88 are supported by upper and lower guides 97—97 that prevent the cutting surfaces 89—89 from slicing through the remaining 0.005 inches of the jacket walls 68—68 and damaging the insulated conductors 13—13. The upper and lower guides 97—97 extend from the base cover 78 and the lower surface of the base 76, respectively, into the first and second transverse grooves 94 and 95 and engage inner surfaces of the bifurcated support block 90 to prevent vertical movement of the support block and the blade 88 relative to the cord 11.

The length of and spacing between the links 91—91 is such that when the support block 90 and the blade 88 are advanced toward the cord 11, leading ends 98—98 of the blade transverse the jacket 12 in substantially a straight line, cutting the upper and lower jacket walls 68—68 as described previously. Then, upon continued advancement of the blade 88, the links 91—91 move the blade along an arcuate path toward the first end 79 of the base 76. The cutting surfaces 89—89 of the blade 88 bear against the jacket walls 68—68 at the cuts formed therein, displacing jacket end section 99 longitudinally along the cord 11 toward the first end 79 of the base 76 and thereby separating the jacket at the cut section, as shown in FIG. 5.

To summarize the step of severing the jacket 12, and referring further to FIG. 4, initially the cord 11 is inserted in the longitudinal groove 77 and is securely positioned therein by actuating the air cylinder 87 to lower the clamp 86. The support block 90 and blade 88 are then advanced by the air cylinder 92 from the position shown in FIG. 4. The links 91—91 initially move the blade 88 along a substantially straight line to cut the jacket walls 68—68, then move the blade along an arcuate path toward the first end 79 of the base 76 to displace and separate the jacket end section 99 from the body of the jacket, as shown in FIG. 5. The guides 97—97 preclude vertical movement of the support block 90 and the blade 88 throughout the severing operation, thereby preventing the cutting surfaces 89—89 from damaging the conductors 13—13.

Referring still further to FIG. 4, after the severing operation, the air cylinders 87 and 92 are actuated to return the clamp 86 and the blade 88 into position for another jacket severing operation. The cord 11 is then transferred to the wire stripper 20 (FIG. 2) and positioned therein so the severed end section 99 (FIGS. 4 and 5) of the jacket 12 corresponds to the leading end 58 (FIG. 2) of the cord.

Referring now to FIG. 2, the step of stripping the severed jacket end section 99 (FIGS. 4 and 5) from the insulated conductors 13—13 is accomplished as described previously. That is, pressurized fluid such as air is injected into the leading end 58 (FIG. 3) of the cord 11, flows through the cord between the jacket 12 and the insulated conductors 13—13 and exits the cord at the severed portion (FIG. 5), thereby generating a fluid bearing between the jacket and the conductors. Air cylinder 61 is now actuated to retract the platform 24 and the closed clamping members 27—27 from the cord clamping device 21 to strip the jacket end section 99 along the fluid bearing.

Where the separate cutting device 75 (FIG. 4) is used, the cutter assembly 23 is eliminated from the wire stripper 20. Or, by reversing the cutting device 75 orientation shown in FIG. 4, the device can be incorporated into the wire stripper 20 in place of the cutter assembly 23 and the cord clamping device 21. That is, the cutting device 75 is rotated 180° from the position shown in FIG. 4 and is mounted on the wire stripper 20 with the clamping device 82 (FIG. 4) and the blade 88 (FIG. 4) approximating the respective positions of the cord clamping device 21 and the cutter assembly 23. Using this orientation, the cord 11 may now be positioned in the cutting device 75 so the jacket end section 99 (FIGS. 4 and 5) corresponds to the cord leading end 58 (FIG. 3). Then, and assuming the grooves 77 and 81 (FIG. 4) are enlarged sufficiently to prevent their clamping the cord 11 upon the application of pressurized fluid thereto, the clamping members 27—27 can be used to strip the jacket end section 99 from the cord.

What is claimed is:

1. A method of stripping a severed length of jacket from a cord that includes at least one insulated conductor, the method comprising the steps of:
   clamping the cord at first and second points on the cord, the first point being proximate to one end of the cord and the second point being proximate to the point of severance on the side opposite to the first point;

applying pressurized fluid between the jacket and the insulated conductor to generate an air cushion between the severed length of jacket and the insulated conductor; and displacing the severed length of jacket along the air cushion to strip the severed jacket from the cord.

2. A method of stripping a predetermined length of insulation from a conductor, comprising the steps of:
   severing the insulation a predetermined distance from one end of the conductor;
   forcing a pressurized fluid between the insulation and the conductor to generate a fluid bearing between the insulation and the conductor; and
   pulling the insulation from the conductor along the fluid bearing.

3. A method of stripping a predetermined length of insulation from a conductor as set forth in claim 2, wherein severing the insulation comprises:
   moving a cutting blade transversely across the insulation at a predetermined distance from the end of the conductor to cut partially through the insulation so that expansion of the insulation by the application of the pressurized fluid ruptures the insulation at the cut to sever the insulation.

4. A method of stripping a predetermined length of insulation from a conductor as set forth in claim 2, wherein severing the insulation comprises:
   positioning a cutting blade transversely across the insulation at a predetermined distance from the end of the conductor so that expansion of the insulation by the application of the pressurized fluid forces the insulation against the cutting blade to sever the insulation.

5. A method of stripping a predetermined length of insulation from a conductor as set forth in claim 2, wherein severing the insulation comprises:
   moving a cutting blade transversely across the insulation at a predetermined distance from the end of the conductor to cut partially through the jacket;

moving the cutting blade relative to the length of the insulated conductor to bear against the cut portion of the insulation and separate the insulation thereat; and
   guiding the moving cutting blade vertically relative to the conductor to preclude the blade from cutting the conductor.

6. A method of severing and stripping a jacket from a cord that includes a plurality of insulated conductors, the method comprising the steps of:
   clamping the jacket at first and second points, the first point being proximate to an end of the cord and the jacket being deformed by the clamping thereat to form a passageway between the jacket and the insulated conductors;
   moving a cutting blade transversely across the jacket between the clamping points at a predetermined distance from the end of the cord to cut partially through the jacket;
   applying pressurized fluid to the end of the cord between the insulated conductors and the jacket and past the passageway to expand the jacket between the end of the cord and the second clamping point to thereby rupture the jacket at the cut and to form a fluid bearing between the jacket and the insulated conductors; and
   displacing the ruptured end length of jacket along the fluid bearing away from the second clamping point.

7. A method of severing and stripping a jacket from a cord that includes a plurality of insulated conductors, the method comprising the steps of:
   clamping the jacket at first and second points, the first point being proximate to an end of the cord and the jacket being deformed by the clamping thereat to form a passageway between the jacket and the insulated conductors;
   positioning a cutting blade transversely across the jacket between the clamping points at a predetermined distance from the end of the cord;
   applying pressurized fluid to the end of the cord between the insulated conductors and the jacket and past the passageway to expand the jacket against the cutting blade to thereby sever the jacket and to form a fluid bearing between the jacket and the insulated conductors; and
   displacing the severed end length of jacket along the fluid bearing away from the cutting blade.

8. A method of severing and stripping a jacket from a cord that includes a plurality of insulated conductors, the method comprising the steps of:
   clamping the jacket at first and second points, the first point being proximate to an end of the cord;

moving a cutting blade (1) transversely across the jacket between the clamping points at a predetermined distance from the end of the cord to cut at least partially through the jacket and (2) relative to the length of the insulated conductor to bear against the cut portion and separate the jacket thereat;
   supporting the moving cutting blade vertically relative to the cord to prevent the blade from cutting the insulated conductors;
   applying pressurized fluid between the end of the jacket and the cut portion to form a fluid bearing between the jacket and the insulated conductors; and
   displacing the separated end length of the jacket along the fluid bearing over the end of the cord.

9. A method of stripping a severed length of jacket from a cord that includes at least one insulated conductor, the method comprising the steps of:
   clamping the cord at first and second points on the cord, the first point being proximate to the point of severance on the side opposite to the first point;
   applying pressurized fluid to the cord proximate to the first clamping point to force the fluid between the jacket and the insulated conductor to form a fluid bearing therebetween; and
   stripping the severed length of jacket from the cord by displacing the jacket along the fluid bearing.

10. A method of stripping a predetermined length of insulation from a conductor, comprising the steps of:
    severing the insulation a predetermined distance from a first end of the conductor;
    applying a pressurized fluid to the first end of the conductor to force the fluid between the insulation and the conductor to generate a fluid bearing therebetween; and
    stripping the insulation from the conductor by displacing the insulation along the fluid bearing.

* * * * *